(12) United States Patent
Chen et al.

(10) Patent No.: US 12,742,634 B2
(45) Date of Patent: Sep. 22, 2026

(54) DIMENSION MEASUREMENT APPARATUS

(71) Applicant: CONTEMPORARY AMPEREX TECHNOLOGY (HONG KONG) LIMITED, Hong Kong (CN)

(72) Inventors: Qizhi Chen, Ningde (CN); Zerong Cao, Ningde (CN); Lin Ma, Ningde (CN); Pengfei Meng, Ningde (CN)

(73) Assignee: CONTEMPORARY AMPEREX TECHNOLOGY(HONG KONG) LIMITED, Hong Kong (CN)

( * ) Notice: Subject to any disclaimer, the term of this patent is extended or adjusted under 35 U.S.C. 154(b) by 117 days.

(21) Appl. No.: 18/826,212

(22) Filed: Sep. 6, 2024

(65) Prior Publication Data

US 2024/0426595 A1 Dec. 26, 2024

Related U.S. Application Data

(63) Continuation of application No. PCT/CN2023/076076, filed on Feb. 15, 2023.

(51) Int. Cl.
*G01B 11/04* (2006.01)
*H01M 4/139* (2010.01)
*H01M 50/54* (2021.01)

(52) U.S. Cl.
CPC .......... *G01B 11/043* (2013.01); *G01B 11/046* (2013.01); *H01M 4/139* (2013.01); *H01M 50/54* (2021.01)

(58) Field of Classification Search
CPC ............................ G01B 11/043; G01B 11/022
See application file for complete search history.

(56) References Cited

FOREIGN PATENT DOCUMENTS

| | | | |
|---|---|---|---|
| CN | 208998740 U | | 6/2019 |
| CN | 112083002 A | | 12/2020 |
| CN | 113503818 A | | 10/2021 |
| CN | 216385482 U | | 4/2022 |
| CN | 115096187 A | | 9/2022 |
| CN | 217505684 U | * | 9/2022 |
| CN | 115402740 A | | 11/2022 |
| CN | 115656197 A | | 1/2023 |
| DE | 102013202658 A1 | | 8/2014 |

OTHER PUBLICATIONS

International Search Report received in the corresponding International Application PCT/CN2023/076076, mailed on Nov. 15, 2023.
The extended European search report received in the counterpart EP application 23895545.4, dated May 12, 2025, 7 pages.

* cited by examiner

*Primary Examiner* — Tony Ko
(74) *Attorney, Agent, or Firm* — K&L Gates LLP

(57) ABSTRACT

A dimension measurement apparatus is disclosed, including a carrier plate and a line scan camera. The carrier plate is configured to carry a to-be-measured item. The line scan camera is disposed opposite to the carrier plate along a first direction and configured to photograph the to-be-measured item. The line scan camera is configured to be movable relative to the carrier plate along a second direction, and the first direction is perpendicular to the second direction. The dimension measurement apparatus can improve the shooting efficiency.

21 Claims, 3 Drawing Sheets

DIMENSION MEASUREMENT APPARATUS

CROSS-REFERENCE TO RELATED APPLICATIONS

This application is a continuation of International Application No. PCT/CN2023/076076, filed on Feb. 15, 2023, the content of which is incorporated herein by reference in its entirety.

TECHNICAL FIELD

This application relates to the field of batteries, and in particular, to a dimension measurement apparatus.

BACKGROUND

Battery cells are widely used in electronic devices such as a mobile phone, a notebook computer, an electric power cart, an electric vehicle, an electric airplane, an electric ship, an electric toy car, an electric toy ship, an electric toy airplane, and a power tool.

A battery cell includes an electrode assembly. During production of battery cells, the dimensions of the electrode assembly need to be measured by photographing to facilitate a subsequent assembling process. How to improve the efficiency of photographing is an important research topic.

SUMMARY

This application provides a dimension measurement apparatus to improve shooting efficiency.

An embodiment of this application provides a dimension measurement apparatus, including a carrier plate and a line scan camera. The carrier plate is configured to carry a to-be-measured item. The line scan camera is disposed opposite to the carrier plate along a first direction and configured to photograph the to-be-measured item. The line scan camera is configured to be movable relative to the carrier plate along a second direction, and the first direction is perpendicular to the second direction.

In the above technical solution, a line scan camera is disposed, and is moved relative to the carrier plate along the second direction, so as to photograph the to-be-measured item such as an electrode assembly on the carrier plate. Compared to a technical solution in which the to-be-measured item is photographed by using an area array camera that pauses repeatedly, the technical solution hereof improves the shooting efficiency.

In some embodiments, the line scan camera is configured to be movable.

In the above technical solution, a plurality of apparatuses assisting in measuring the dimensions of the electrode assembly may be fixed onto the carrier plate. Therefore, the line scan camera is set movable, thereby reducing the complexity of disposing the dimension measurement apparatus.

In some embodiments, a plurality of the line scan cameras are disposed. The plurality of line scan cameras include a first line scan camera and a second line scan camera. The first line scan camera and the second line scan camera are arranged along a third direction, and the third direction intersects the second direction.

In the above technical solution, at least two line scan cameras are disposed, thereby expanding the shooting range and being able to photograph and measure an electrode assembly of a relatively large size, and in turn, broadening the applicable range of the dimension measurement apparatus. Alternatively, two line scan cameras may be arranged along a relatively-large-dimension direction (for example, the length direction) of the electrode assembly, thereby shortening the distance of movement of the line scan camera relative to the carrier plate, and increasing the shooting efficiency.

In some embodiments, the to-be-measured item is an electrode assembly.

In some embodiments, the electrode assembly includes an electrode body and two tabs. The electrode body includes a top region and a bottom region disposed opposite to each other. The two tabs extend out from the top region. The third direction is configured to be parallel to an arrangement direction of the top region and the bottom region.

In the above technical solution, the third direction is parallel to the arrangement direction of the top region and the bottom region. In this way, the first line scan camera and the second line scan camera can photograph the top region and the bottom region of the electrode assembly respectively, so as to obtain dimensional information such as the length and width of the electrode assembly.

In some embodiments, the dimension measurement apparatus further includes a shelf. The carrier plate and the line scan camera are disposed on the shelf.

In the above technical solution, the carrier plate and the line scan camera are connected onto the shelf, so that the dimension measurement apparatus can be connected into a whole and can be conveniently stored and moved. Moreover, the dimension measurement apparatus can be fixed onto another object by just fixing the shelf onto the object, thereby simplifying the operation.

In some embodiments, the dimension measurement apparatus further includes a backlight source connected to the shelf. The carrier plate includes a carrier surface configured to carry an electrode assembly and a back surface opposite to the carrier surface. The backlight source is located on a side of back surface, the side facing away from the carrier surface.

In the above technical solution, a backlight source is disposed to irradiate a part to be dimensioned on the electrode assembly. The backlight source is used together with the line scan camera to increase the brightness of the photographing and improve the accuracy of the measurement result.

In some embodiments, the dimension measurement apparatus further includes a connecting piece. The connecting piece is configured to connect the carrier plate and the shelf. The number of the backlight sources is two. An accommodation space is provided between the two backlight sources. The connecting piece passes through the accommodation space.

In the above technical solution, the connecting piece directly passes through the accommodation space to get connected to the carrier plate. In this way, not only the structure of the connecting piece is simplified, but also the connecting piece is prevented from interfering with the backlight source. In other words, the connecting piece is almost unlikely to block the backlight source from irradiating the electrode assembly, thereby reducing the impact on the photographing of the electrode assembly.

In some embodiments, the dimension measurement apparatus further includes a flattening mechanism. The flattening mechanism includes a first driving piece and a pressing plate. The to-be-measured item is an electrode assembly.

The first driving piece is connected to the shelf and configured to drive the pressing plate to press a tab of the electrode assembly.

In the above technical solution, during measurement of a tab, the edges of the tab may warp, a part of the tab may bulge, or other surface unevenness phenomena may occur. Therefore, a flattening mechanism is disposed to maximally flatten the part at which the tab is uneven, so as to improve the accuracy of the dimension measurement of the tab.

In some embodiments, the flattening mechanism further includes a supporting piece. The supporting piece is connected to the shelf and includes a contacting plane. The contacting plane is configured to prop and contact a surface of the tab of the electrode assembly, the surface facing away from the pressing plate.

In the above technical solution, a supporting piece is disposed to support the tab, thereby not only making it convenient for the pressing plate to press one side of the tab, but also enabling the other side of the tab to be pressed by the contacting plane. In this way, both sides of the tab are pressed, thereby further improving the flatness and evenness of the tab, and in turn, improving the accuracy of the dimension measurement of the tab.

In some embodiments, the dimension measurement apparatus further includes a positioning mechanism. The positioning mechanism includes a second driving piece and a positioning piece. The second driving piece is connected to the shelf and configured to drive the positioning piece to push the to-be-measured item to a preset position.

When the to-be-measured item is placed on the carrier plate, the position of the to-be-measured item is not accurate. For example, the to-be-measured item may be at an angle to or at a distance from the preset position. In these embodiments of this application, a positioning mechanism pushes the to-be-measured item to the preset position, so as to photograph the to-be-measured item at the preset position. This increases the accuracy of the results of photographing and measurement, reduces the possibility of failure to photograph the edge of the to-be-measured item caused by an inaccurate position, and improves the accuracy of the measurement result.

In some embodiments, a shooting range of the first line scan camera covers at least the two tabs of the electrode assembly. A shooting range of the second line scan camera covers at least a bottom region of the electrode assembly.

In the above technical solution, with the above arrangement, the first line scan camera can photograph the two tabs to obtain the length by which the tab extends from the top region, obtain the distance between the two tabs, and determine the position of a junction between the tab and the top region, that is, determine the position of a top surface of the electrode body. The second line scan camera can determine the position of a side facing away from the tab in the bottom region. In this way, after the position of the top surface and the position of the side facing away from the tab are learned, the length of the electrode body can be determined. After the dimensions of the bottom region are learned, the width of the electrode assembly can be learned, thereby obtaining more dimensional data of the electrode assembly.

In some embodiments, the first line scan camera is further configured to photograph a top region of the electrode assembly. A shooting range, covering the top region and extending along the third direction, of the first line scan camera is D1, satisfying: D1>30 mm.

In the above technical solution, the shooting range of the first line scan camera along the third direction is set to be greater than 30 mm, so that the shooting range is relatively large, thereby reducing the impact on the measurement result caused by the reasons such as edge folding or warping, and improving the accuracy of the measurement result.

In some embodiments, a shooting range of the first line scan camera along the third direction is D2, and a standard dimension of the tab along the third direction is D3, satisfying: $D2>D1+D3+K1$, and $5\ mm \leq K1 \leq 40\ mm$.

In the above technical solution, the shooting range D3 of the first line scan camera along the third direction is set to be greater than a sum of D1, D3, and K1, so that the coverage range of the first line scan camera along the third direction can sufficiently cover the tab and the top region, thereby improving the accuracy of the algorithmic edge detection, and improving the accuracy of the measurement result.

In some embodiments, the shooting range of the first line scan camera along the third direction further includes a first blank region. The first blank region is located on a side of the tab, the side facing away from the top region.

In the above technical solution, a first blank region is disposed on a side of the tab, the side facing away from the top region. In this way, the successful capturing of the image of the tab is almost ensured, the accuracy of the algorithmic edge detection is improved, and the accuracy of the dimension measurement of the tab is further increased.

In some embodiments, a shooting range, covering the bottom region and extending along the third direction, of the second line scan camera is D4, satisfying: D4>30 mm.

In the above technical solution, the shooting range of the second line scan camera along the third direction is set to be greater than 30 mm, so that the shooting range is relatively large, thereby reducing the impact on the measurement result caused by the reasons such as edge folding or warping, and improving the accuracy of the measurement result.

In some embodiments, a shooting range of the second line scan camera along the third direction is D5, satisfying: $D5>D4+K2$, and $5\ mm \leq K2 \leq 40\ mm$.

In the above technical solution, the shooting range D5 of the second line scan camera along the third direction is set to be greater than a sum of D4 and K2, so that the coverage range of the second line scan camera along the third direction can sufficiently cover the bottom region, thereby improving the accuracy of the measurement result.

In some embodiments, the shooting range of the second line scan camera along the third direction further includes a second blank region. The second blank region is located on a side of the bottom region, the side facing away from the top region.

In the above technical solution, a second blank region is disposed on a side of the bottom region, the side facing away from the top region. In this way, the successful capturing of the image of the bottom region is almost ensured, the accuracy of the algorithmic edge detection is improved, and the accuracy of the dimension measurement of the bottom region is increased.

In some embodiments, a resolution of the first line scan camera is Σ1, satisfying: $\Sigma1 \geq 40 \times D2/L$, L being a tolerance zone width of a dimension of the electrode assembly along the third direction.

In the above technical solution, the resolution of the first line scan camera is correlated with the shooting range and the tolerance zone width of the electrode assembly to satisfy the resolution requirements of different electrode assemblies and improve the accuracy of the measurement result.

In some embodiments, a resolution of the second line scan camera is Σ2, satisfying: $\Sigma 2 \geq 40 \times D4/L$, L being a tolerance zone width of a dimension of the electrode assembly along the third direction.

In the above technical solution, the resolution of the second line scan camera is correlated with the shooting range and the tolerance zone width of the electrode assembly to satisfy the resolution requirements of different electrode assemblies and improve the accuracy of the measurement result.

In some embodiments, a movement speed of the line scan camera along the second direction is v, satisfying: 450 mm/s<v<600 mm/s.

In the above technical solution, the movement speed of the line scan camera along the second direction is set to be less than 600 mm/s, thereby reducing the possibility of frame loss and improving the shooting quality. The speed of the line scan camera along the second direction Y is set to be greater than 450 mm/s, thereby improving the shooting efficiency and increasing the detection speed.

BRIEF DESCRIPTION OF DRAWINGS

The following describes features, advantages, and technical effects of exemplary embodiments of this application with reference to accompanying drawings.

Figure 1:
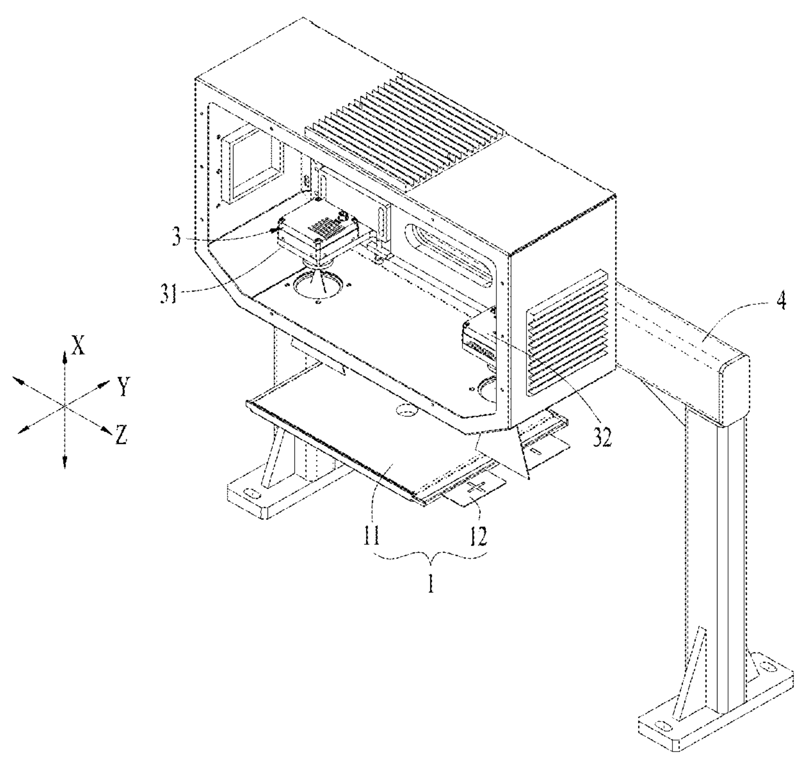
FIG. 1 is a schematic diagram of a partial structure of a dimension measurement apparatus according to an embodiment of this application.

The drawings are not drawn to scale.

LIST OF REFERENCE NUMERALS

1. electrode assembly; 11. electrode body; 12. tab; 13. top region; 14. bottom region;
2. carrier plate; 21. carrier surface; 22. back surface;
3. line scan camera; 31. first line scan camera; 311. first blank region; 32. second line scan camera; 321. second blank region;
4. shelf;
5. backlight source; 51. accommodation space;
6. flattening mechanism; 61. first driving piece; 62. pressing plate; 63. supporting piece; 631. contacting plane;
7. positioning mechanism; 71. second driving piece; 72. positioning piece;
8. connecting piece;
X. first direction; Y. second direction; Z. third direction

DETAILED DESCRIPTION OF EMBODIMENTS

To make the objectives, technical solutions, and advantages of some embodiments of this application clearer, the following gives a clear and complete description of the technical solutions in some embodiments of this application with reference to the drawings in some embodiments of this application. Apparently, the described embodiments are merely a part of but not all of the embodiments of this application. All other embodiments derived by a person of ordinary skill in the art based on the embodiments of this application without making any creative efforts shall fall within the protection scope of this application.

Unless otherwise defined, all technical and scientific terms used herein have the same meanings as what is normally understood by a person skilled in the technical field of this application. The terms used in the specification of this application are merely intended to describe specific embodiments but not intended to limit this application. The terms "include" and "contain" and any variations thereof used in the specification, claims, and brief description of drawings of this application are intended as non-exclusive inclusion. The terms such as "first" and "second" used in the specification, claims, and brief description of drawings herein are intended to distinguish between different items, but are not intended to describe a specific sequence or order of precedence.

Reference to "embodiment" in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments.

In the description of this application, unless otherwise expressly specified and defined, the terms "mount", "concatenate", "connect", and "attach" are understood in a broad sense. For example, a "connection" may be a fixed connection, a detachable connection, or an integrated connection; or may be a direct connection or an indirect connection implemented through an intermediary; or may be internal communication between two components. A person of ordinary skill in the art is able to understand the specific meanings of the terms in this application according to specific situations.

The term "and/or" in this application indicates merely a relation for describing the related items, and represents three possible relationships. For example, "A and/or B" may represent the following three circumstances: A alone, both A and B, and B alone. In addition, the character "/" herein generally indicates an "or" relationship between the item preceding the character and the item following the character.

In embodiments of this application, the same reference numeral denotes the same component. For brevity, detailed descriptions of the same component are omitted in a different embodiment. Understandably, dimensions such as thickness, length, and width of various components in some embodiments of this application shown in the drawings, and dimensions such as overall thickness, length, and width of an integrated device are merely illustrative descriptions, but do not constitute any limitation on this application.

"A plurality of" referred to in this application means two or more (including two).

In this application, a battery cell may include a lithium-ion secondary battery, a lithium-ion primary battery, a lithium-sulfur battery, a sodium-lithium-ion battery, a sodium-ion battery, a magnesium-ion battery, or the like, without being limited in embodiments of this application. The battery cell may be in various shapes such as cylindrical, flat, cuboidal or other shapes. The shape of the battery cell is not limited herein. In terms of the packaging form, the battery cell is typically classed into three types: cylindrical battery cell, prismatic battery cell, and pouch-type battery cell. The type of the battery cell is not limited herein.

The battery mentioned in embodiments of this application means a unitary physical module that includes one or more battery cells to provide a higher voltage and a higher capacity. For example, the battery mentioned in this application may include a battery module, a battery pack, or the like. A battery typically includes a housing configured to package one or more battery cells. The housing prevents liquid or other foreign matters from affecting the charging or discharging of the battery cells.

In a production process of a battery cell, the dimensions of an electrode assembly such as the length and width of the electrode assembly need to be detected, so as to check whether the electrode assembly is qualified. In the related art, an area array camera typically used for photographing the electrode assembly and then the dimensional data is calculated.

The applicant hereof finds that the shooting efficiency of the area array camera is relatively low because the camera needs to move to different positions sequentially to photograph the same electrode assembly due to a limited range of the camera, where the movement and pauses are time-consuming.

In view of the above problem, this application provides a technical solution. The technical solution improves the shooting efficiency by using a moving line scan camera to capture images of a to-be-measured item because the line scan camera moves at a specified speed without pauses when capturing the images.

Figure 2:
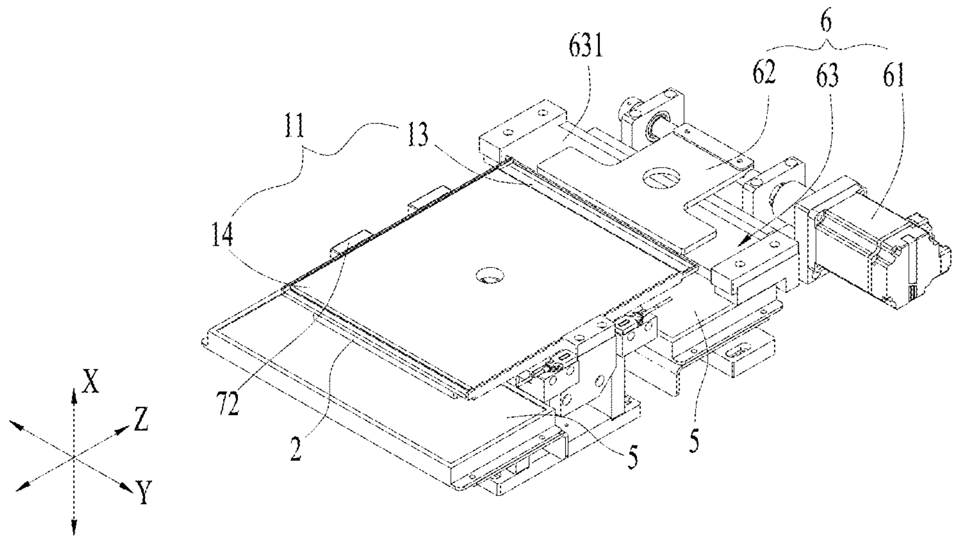
FIG. 2 is a schematic diagram of another partial structure of a dimension measurement apparatus according to an embodiment of this application.

FIG. 1 is a schematic diagram of a partial structure of a dimension measurement apparatus according to an embodiment of this application; FIG. 2 is a schematic diagram of another partial structure of a dimension measurement apparatus according to an embodiment of this application; and FIG. 3 is a schematic diagram of still another partial structure of a dimension measurement apparatus according to an embodiment of this application.

Figure 3:
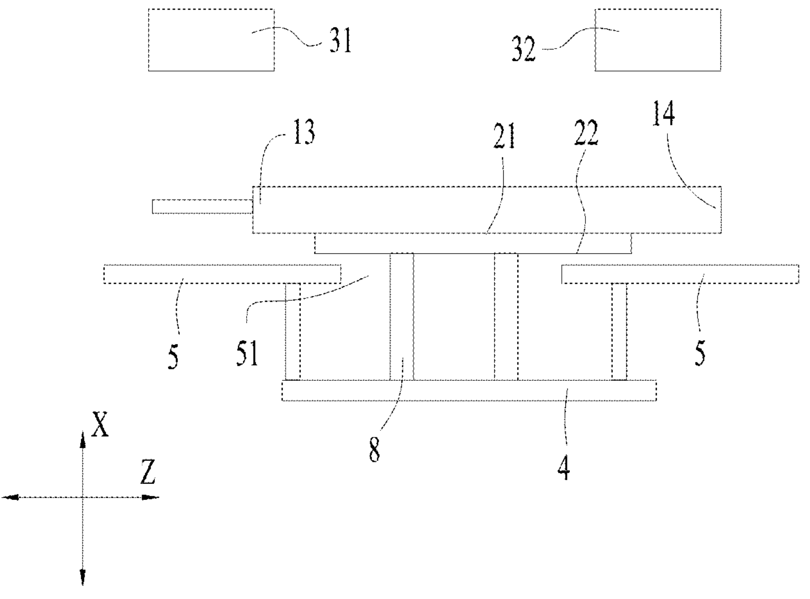
FIG. 3 is a schematic diagram of still another partial structure of a dimension measurement apparatus according to an embodiment of this application.

As shown in FIG. 1 to FIG. 3, the dimension measurement apparatus according to an embodiment of this application includes a carrier plate 2 and a line scan camera 3. The carrier plate 2 is configured to carry a to-be-measured item. The line scan camera 3 is disposed opposite to the carrier plate 2 along a first direction X and configured to photograph the to-be-measured item. The line scan camera 3 is configured to be movable relative to the carrier plate 2 along a second direction Y, and the first direction X is perpendicular to the second direction Y.

The shape of the carrier plate 2 is not limited in this embodiment of this application, and may be rectangular, circular, or another irregular shape. As an example, the carrier plate 2 includes a carrier plane configured to carry an electrode assembly 1.

Optionally, the carrier plate 2 is smaller than the electrode assembly 1 in size, and the carrier plate 2 can be covered by the electrode assembly 1.

Optionally, the carrier plate 2 is made of a transparent material.

In this embodiment of this application, the first direction X is perpendicular to the carrier plane, and the second direction Y is parallel to the carrier plane. Further optionally, the second direction Y is parallel to a width direction or a length direction of the electrode assembly 1. A dimension of the electrode assembly 1 along the length direction is greater than or equal to a dimension of the electrode assembly along the width direction.

In this embodiment of this application, the line scan camera 3 is configured to be movable relative to the carrier plate 2 along the second direction Y. That is, the line scan camera 3 and the carrier plate 2 are in motion relative to each other. In other words, the line scan camera 3 moves alone, or the carrier plate 2 moves alone, or both the line scan camera 3 and the carrier plate 2 move to produce a relative displacement.

The manner of setting the line scan camera 3 and/or the carrier plate 2 in motion is not limited in this embodiment of this application. As an example, a linear motor, a cylinder, a hydraulic cylinder, or the like drives the line scan camera 3 or the carrier plate 2 in motion, or drives both the line scan camera 2 and the carrier plate 2 in motion together.

The to-be-measured item in this embodiment of this application may be an electrode assembly or a component, such as a battery cell, that needs to be dimensioned.

A line scan camera 3 is disposed, and is moved relative to the carrier plate 2 along the second direction Y, so as to photograph the to-be-measured item such as an electrode assembly 1 on the carrier plate 2. Compared to a technical solution in which the to-be-measured item is photographed by using an area array camera that pauses repeatedly, the technical solution hereof improves the shooting efficiency. Moreover, because the shooting precision of the line scan camera 3 is generally higher than that of the area array camera, the dimension measurement apparatus according to this embodiment of this application also increases the shooting precision. Therefore, the calculation result for the photographing of the to-be-measured item is more precise, thereby improving the measurement precision of the to-be-measured item.

In some embodiments, the line scan camera 3 is configured to be movable.

A plurality of apparatuses assisting in measuring the dimensions of the electrode assembly 1 may be fixed onto the carrier plate 2. Therefore, the line scan camera 3 is set movable, thereby reducing the complexity of disposing the dimension measurement apparatus.

In some embodiments, a plurality of the line scan cameras 3 are disposed. The plurality of line scan cameras 3 include a first line scan camera 31 and a second line scan camera 32. The first line scan camera 31 and the second line scan camera 32 are arranged along a third direction Z, and the third direction Z intersects the second direction Y.

Whether the first line scan camera 31 is identical to the second line scan camera 32 is not limited in these embodiments of this application, and the two cameras may be the same or different.

In these embodiments of this application, the shooting range of the first line scan camera 31 may overlap the shooting range of the second line scan camera 32, or the two cameras may photograph different parts of the electrode assembly 1 separately.

Optionally, the third direction Z is perpendicular to the second direction Y. Further optionally, the third direction Z is perpendicular to the first direction X.

At least two line scan cameras 3 are disposed, thereby expanding the shooting range and being able to photograph and measure an electrode assembly 1 of a relatively large size, and in turn, broadening the applicable range of the dimension measurement apparatus. Alternatively, two line scan cameras 3 may be arranged along a relatively-large-dimension direction (for example, the length direction) of the electrode assembly 1, thereby shortening the distance of movement of the line scan camera 3 relative to the carrier plate 2, and increasing the shooting efficiency.

In some embodiments, the to-be-measured item is an electrode assembly 1.

In some embodiments, the electrode assembly 1 includes an electrode body 11 and two tabs 12. The electrode body 11 includes a top region 13 and a bottom region 14 disposed opposite to each other. The two tabs 12 extend out from the top region 13. The third direction Z is configured to be parallel to an arrangement direction of the top region 13 and the bottom region 14.

When the electrode assembly 1 is placed on the carrier plate 2, the top region 13 and the bottom region 14 are arranged along the third direction Z.

The third direction Z is set parallel to the arrangement direction of the top region 13 and the bottom region 14. In this way, the first line scan camera 31 and the second line scan camera 32 can photograph the top region 13 and the bottom region 14 of the electrode assembly 1 respectively, so as to obtain dimensional information such as the length and width of the electrode assembly 1.

Optionally, extension directions of shooting axes of the first line scan camera 31 and the second line scan camera 32 are parallel to the third direction Z.

Optionally, the second direction Y is perpendicular to the third direction Z. With such an arrangement, for a roughly rectangular electrode assembly 1, if the first line scan camera 31 and the second line scan camera 32 are arranged along the length direction of the electrode assembly 1 and move along the width direction of the electrode assembly 1, the movement distance of the first line scan camera 31 and the second line scan camera 32 can be reduced, and the photographing efficiency can be improved.

In some embodiments, the dimension measurement apparatus further includes a shelf 4. The carrier plate 2 and the line scan camera 3 are disposed on the shelf 4.

The manner of connecting the shelf 4 to the carrier plate 2 and the line scan camera 3 is not limited in these embodiments of this application. As an example, the shelf 4 is fixedly connected to the carrier plate 2, and the shelf 4 is movably connected to the line scan camera 3. For another example, the shelf 4 is movably connected to the carrier plate 2, and the shelf 4 is fixedly connected to the line scan camera 3. For still another example, the shelf 4 is movably connected to both the carrier plate 2 and the line scan camera 3.

The carrier plate 2 and the line scan camera 3 are connected onto the shelf 4, so that the dimension measurement apparatus can be connected into a whole and can be conveniently stored and moved. Moreover, the dimension measurement apparatus can be fixed onto another object by just fixing the shelf 4 onto the object, thereby simplifying the operation.

In some embodiments, the dimension measurement apparatus further includes a backlight source 5 connected to the shelf 4. The carrier plate 2 includes a carrier surface 21 configured to carry an electrode assembly 1 and a back surface 22 opposite to the carrier surface 21. The backlight source 5 is located on a side of back surface 22, the side facing away from the carrier surface 21.

The carrier surface 21 in these embodiments of this application includes the above carrier plane.

Optionally, the backlight source 5 and the carrier plate 2 are spaced apart.

The backlight source 5 in these embodiments of this application may irradiate a part of the electrode assembly 1 or irradiate all of the electrode assembly 1.

The shape of the backlight source 5 is not limited in these embodiments of this application. As an example, the backlight source 5 may be a rectangular light source, a trapezoidal light source, or the like.

A backlight source 5 is disposed to irradiate a part to be dimensioned on the electrode assembly 1. The backlight source is used together with the line scan camera 3 to increase the brightness of the photographing and improve the accuracy of the measurement result.

In some embodiments, the dimension measurement apparatus further includes a connecting piece 8. The connecting piece 8 is configured to connect the carrier plate 2 and the shelf 4. The number of the backlight sources 5 is two. An accommodation space 51 is provided between the two backlight sources 5. The connecting piece 8 passes through the accommodation space 51.

The shape of the connecting piece 8 is not limited in these embodiments of this application. As an example, the connecting piece 8 may be in the shape of a plate, a rod, or another irregular shape.

Optionally, the connecting piece 8 is connected to the back surface 22.

Optionally, a projection of the connecting piece 8 on a first plane along the first direction X does not overlap a projection of the backlight source 5 on the first plane along the first direction X, where the first plane is perpendicular to the first direction X.

The connecting piece 8 directly passes through the accommodation space 51 to get connected to the carrier plate 2. In this way, not only the structure of the connecting piece 8 is simplified, but also the connecting piece 8 is prevented from interfering with the backlight source 5. In other words, the connecting piece is almost unlikely to block the backlight source 5 from irradiating the electrode assembly 1, thereby reducing the impact on the photographing of the electrode assembly 1.

The electrode assembly 1 includes an electrode body 11 and two tabs 12. The electrode body 11 includes a top region 13 and a bottom region 14 disposed opposite to each other. The two tabs 12 extend out from the top region 13. The third direction Z is configured to be parallel to an arrangement direction of the top region 13 and the bottom region 14. Optionally, the two backlight sources 5 are spaced apart along the third direction Z. The two backlight sources 5 are set to be arranged along the third direction Z. In this way, one backlight source 5 can irradiate the tab 12 and the top region 13, and the other backlight source 5 can irradiate the bottom region 14, thereby improving the precision of measuring such regions.

In some embodiments, the dimension measurement apparatus further includes a flattening mechanism 6. The flattening mechanism 6 includes a first driving piece 61 and a pressing plate 62. The to-be-measured item is an electrode assembly 1. The first driving piece 61 is connected to the shelf 4 and configured to drive the pressing plate 62 to press a tab 12 of the electrode assembly 1.

The pressing plate 62 in these embodiments of this application is made of a transparent material. The shape of the pressing plate 62 is not limited in these embodiments of this application. As an example, the pressing plate 62 is a T-shaped plate or a triangular plate.

The pressing plate 62 in these embodiments of this application includes a pressing plane. The pressing plane is configured to press against and flatten the tab 12.

Optionally, the pressing plate 62 can press both tabs 12 of the electrode assembly 1 concurrently.

The specific structure of the first driving piece 61 is not limited in these embodiments of this application. As an example, the first driving piece 61 is a motor, a hydraulic cylinder, a cylinder, or the like. The first driving piece 61 in these embodiments of this application may drive the pressing plate 62 to rotate to press the tabs 12, or may drive the pressing plate 62 into linear motion to press the tabs 12.

During measurement of a tab 12, the edges of the tab may warp, a part of the tab may bulge, or other surface unevenness phenomena may occur. Therefore, a flattening mechanism 6 is disposed to maximally flatten the part at which the tab 12 is uneven, so as to improve the accuracy of the dimension measurement of the tab 12.

In some embodiments, the flattening mechanism 6 further includes a supporting piece 63. The supporting piece 63 is connected to the shelf 4 and includes a contacting plane 631. The contacting plane 631 is configured to prop and contact a surface of the tab 12 of the electrode assembly 1, the surface facing away from the pressing plate 62.

The shape of the supporting piece 63 is not limited in these embodiments of this application. As an example, the supporting piece 63 is in the shape of a plate, a bar, or a strip.

A supporting piece 63 is disposed to support the tab 12, thereby not only making it convenient for the pressing plate 62 to press one side of the tab, but also enabling the other side of the tab 12 to be pressed by the contacting plane 631. In this way, both sides of the tab 12 are pressed, thereby further improving the flatness and evenness of the tab 12, and in turn, improving the accuracy of the dimension measurement of the tab 12.

Figure 4:
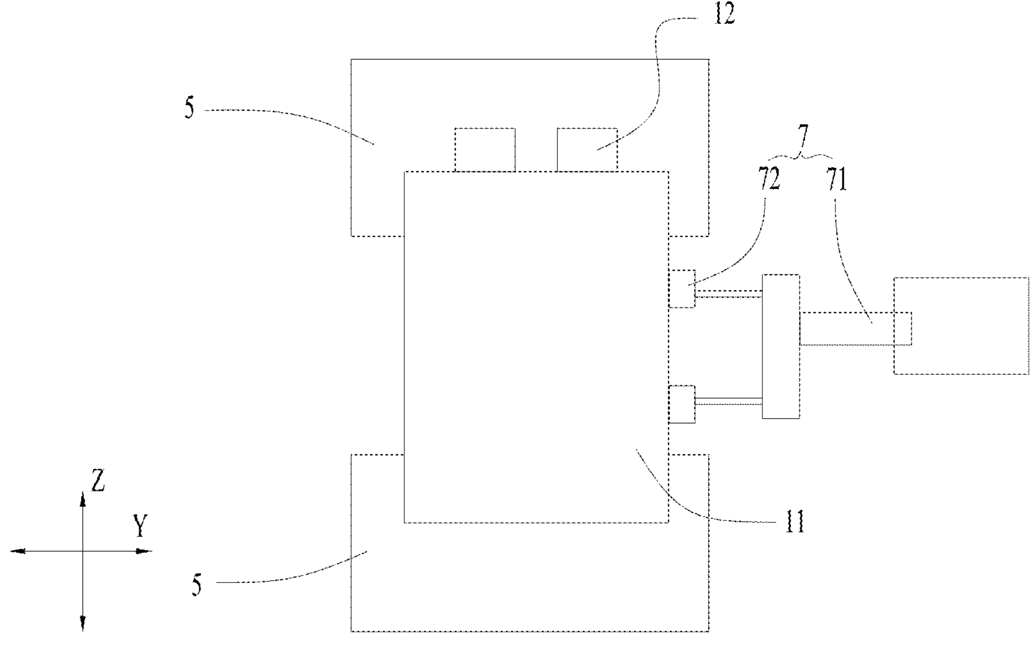
FIG. 4 is a schematic structural diagram of a positioning mechanism and a backlight source of a dimension measurement apparatus according to an embodiment of this application.

FIG. 4 is a schematic structural diagram of a positioning mechanism and a backlight source of a dimension measurement apparatus according to an embodiment of this application.

Referring to FIG. 4, in some embodiments, the dimension measurement apparatus further includes a positioning mechanism 7. The positioning mechanism 7 includes a second driving piece 71 and a positioning piece 72. The second driving piece 71 is connected to the shelf 4 and configured to drive the positioning piece 72 to push the to-be-measured item to a preset position.

The specific shape of the positioning piece 72 is not limited in these embodiments of this application. As an example, the positioning piece 72 is in the shape of a bar or a plate.

The preset position in these embodiments of this application may be determined based on the factors such as the specification of the to-be-measured item, the position at which the to-be-measured item is placed, the shooting range of the line scan camera. Optionally, the preset positions of the to-be-measured items of the same specification are the same.

The specific structure of the second driving piece 71 is not limited in these embodiments of this application. As an example, the second driving piece 71 is a cylinder, a hydraulic cylinder, or a linear motor. The second driving piece 71 drives the positioning piece 72 into linear motion.

When the to-be-measured item is placed on the carrier plate 2, the position of the to-be-measured item is not accurate. For example, the to-be-measured item may be at an angle to or at a distance from the preset position. In these embodiments of this application, a positioning mechanism 7 pushes the to-be-measured item to the preset position, so as to photograph the to-be-measured item at the preset position. This increases the accuracy of the results of photographing and measurement, reduces the possibility of failure to photograph the edge of the to-be-measured item caused by an inaccurate position, and improves the accuracy of the measurement result.

In some embodiments, a shooting range of the first line scan camera 31 covers at least the two tabs 12 of the electrode assembly 1. A shooting range of the second line scan camera 32 covers at least a bottom region 14 of the electrode assembly 1.

In these embodiments of this application, the shooting range of the first line scan camera 31 covers at least all of the two tabs 12 of the electrode assembly 1.

The bottom region 14 includes a side of the electrode body 11, the side facing away from the tab 12.

With the above arrangement, the first line scan camera 31 can photograph the two tabs 12 to obtain the length by which the tab 12 extends from the top region 13, obtain the distance between the two tabs 12, and determine the position of a junction between the tab 12 and the top region 13, that is, determine the position of a top surface of the electrode body 11. The second line scan camera 32 can determine the position of a side facing away from the tab 12 in the bottom region 14. In this way, after the position of the top surface and the position of the side facing away from the tab 12 are learned, the length of the electrode body 11 can be determined. After the dimensions of the bottom region 14 are learned, the width of the electrode assembly 1 can be learned, thereby obtaining more dimensional data of the electrode assembly 1.

Figure 5:
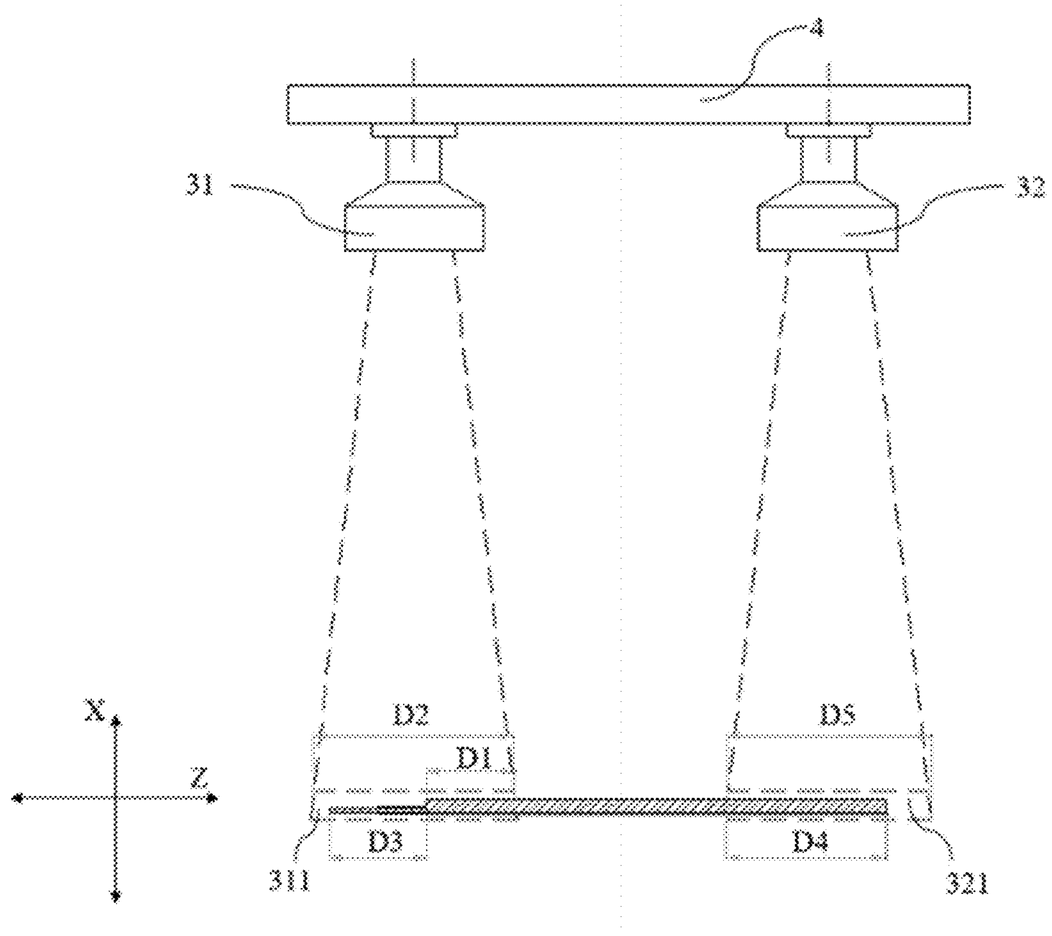
FIG. 5 is a schematic diagram of a shooting range of a line scan camera of a dimension measurement apparatus according to an embodiment of this application.

FIG. 5 is a schematic diagram of a shooting range of a line scan camera of a dimension measurement apparatus according to an embodiment of this application.

Referring to FIG. 5, in some embodiments, the first line scan camera 31 is further configured to photograph a top region 13 of the electrode assembly 1. A shooting range, covering the top region 13 and extending along the third direction Z, of the first line scan camera 31 is D1, satisfying: D1>30 mm.

In these embodiments of this application, the top region 13 includes a surface connected to the tab 12.

The first line scan camera 31 covers the shooting range of the top region 13 along the third direction Z. In other words, the coverage range of the first line scan camera 31 extends from the surface connected to the tab 12 in the electrode body 11 toward the center of the electrode body 11 until D1 along the third direction Z.

The top region 13 may be measured in conjunction with the measurement of the bottom region 14 to more accurately learn the length and width of the electrode body 11, thereby further improving the accuracy of the measurement result.

If the value of D1 is unduly small, then the measured range of the top region 13 is relatively small, and therefore, the uncertainty of the measurement result is higher. In other words, the measurement result may be considerably affected by the reasons such as edge folding and warping of the electrode body 11. Therefore, the shooting range of the first line scan camera 31 along the third direction Z is set to be greater than 30 mm, so that the shooting range is relatively large, thereby reducing the impact on the measurement result caused by the reasons such as edge folding or warping, and improving the accuracy of the measurement result.

In some embodiments, a shooting range of the first line scan camera 31 along the third direction Z is D2, and a standard dimension of the tab 12 along the third direction Z is D3, satisfying: D2>D1+D3+K1, and 5 mm≤K1≤40 mm.

In these embodiments of this application, the standard dimension of the tab 12 along the third direction Z is the dimension of the tab 12 that is set during manufacturing. The accurate measured dimension of the tab may deviate from the standard dimension.

In these embodiments of this application, K1 is a constant, and may be any value falling within a range of 5 mm to 40 mm.

The shooting range D3 of the first line scan camera 31 along the third direction Z is set to be greater than a sum of D1, D3, and K1, so that the coverage range of the first line scan camera 31 along the third direction Z can sufficiently cover the tab 12 and the top region 13, thereby improving the accuracy of the algorithmic edge detection, and improving the accuracy of the measurement result.

In some embodiments, the shooting range of the first line scan camera 31 along the third direction Z further includes a first blank region 311. The first blank region 311 is located on a side of the tab 12, the side facing away from the top region 13.

In these embodiments, the first blank region 311 means a shooting range in which the first line scan camera 31 does not photograph the electrode assembly 1.

A first blank region 311 is disposed on a side of the tab 12, the side facing away from the top region 13. In this way, the successful capturing of the image of the tab 12 is almost ensured, and the accuracy of the dimension measurement of the tab 12 is further increased.

In some embodiments, a shooting range, covering the bottom region 14 and extending along the third direction Z, of the second line scan camera 32 is D4, satisfying: $D4>30$ mm.

The second line scan camera 32 covers the shooting range of the bottom region 14 along the third direction Z. In other words, the coverage range of the second line scan camera 32 extends from a side, facing away from the tab 12, of the electrode body 11 toward the center of the electrode body 11 until D4 along the third direction Z.

If the value of D4 is unduly small, then the measured range of the bottom region 14 is relatively small, and therefore, the uncertainty of the measurement result is higher. In other words, the measurement result may be considerably affected by the reasons such as edge folding and warping of the electrode body 11. Therefore, the shooting range of the second line scan camera 32 along the third direction Z is set to be greater than 30 mm, so that the shooting range is relatively large, thereby reducing the impact on the measurement result caused by the reasons such as edge folding or warping, and improving the accuracy of the measurement result.

In some embodiments, a shooting range of the second line scan camera 32 along the third direction Z is D5, satisfying: $D5>D4+K2$, and $5\text{ mm}\le K2\le 40\text{ mm}$.

In these embodiments of this application, K2 is a constant, and may be any value falling within a range of 5 mm to 40 mm.

The shooting range D5 of the second line scan camera 32 along the third direction Z is set to be greater than a sum of D4 and K2, so that the coverage range of the second line scan camera 32 along the third direction Z can sufficiently cover the bottom region 14, thereby improving the accuracy of the measurement result.

In some embodiments, the shooting range of the second line scan camera 32 along the third direction Z further includes a second blank region 321. The second blank region 321 is located on a side of the bottom region 14, the side facing away from the top region 13.

In these embodiments, the second blank region 321 means a shooting range in which the second line scan camera 32 does not photograph the electrode assembly 1.

A second blank region 321 is disposed on a side of the bottom region 14, the side facing away from the top region 13. In this way, the successful capturing of the image of the bottom region 14 is almost ensured, the accuracy of the algorithmic edge detection is improved, and the accuracy of the dimension measurement of the bottom region 14 is increased.

In some embodiments, a resolution of the first line scan camera 31 is Σ1, satisfying: $\Sigma1\ge 40\times D2/L$, L being a tolerance zone width of a dimension of the electrode assembly 1 along the third direction Z.

The tolerance zone width of the dimension of the electrode assembly 1 along the third direction Z in these embodiments of this application is a preset value, and is predetermined depending on the manufacturing dimensional standard of the electrode assembly 1.

The resolution of the first line scan camera 31 is correlated with the shooting range and the tolerance zone width of the electrode assembly 1 to satisfy the resolution requirements of different electrode assemblies 1 and improve the accuracy of the measurement result.

In some embodiments, a resolution of the second line scan camera 32 is Σ2, satisfying: $\Sigma2\ge 40\times D4/L$, L being a tolerance zone width of a dimension of the electrode assembly 1 along the third direction Z.

The resolution of the second line scan camera 32 is correlated with the shooting range and the tolerance zone width of the electrode assembly 1 to satisfy the resolution requirements of different electrode assemblies 1 and improve the accuracy of the measurement result.

In some embodiments, a movement speed of the line scan camera 3 along the second direction Y is v, satisfying: $450\text{ mm/s}<v<600\text{ mm/s}$.

The higher the speed of the line scan camera 3 along the second direction Y, the shorter the shooting time for each electrode assembly 1. However, if the movement speed of the line scan camera 3 along the second direction Y is unduly high, frame loss may occur, and the shooting quality becomes inferior. The lower the movement speed of the line scan camera 3 along the second direction Y, the longer the shooting time, and the lower the shooting efficiency.

In view of this, the movement speed of the line scan camera 3 along the second direction Y is set to be less than 600 mm/s, thereby reducing the possibility of frame loss and improving the shooting quality. The speed of the line scan camera 3 along the second direction Y is set to be greater than 450 mm/s, thereby improving the shooting efficiency and increasing the detection speed.

Referring to FIG. 1 to FIG. 3, the dimension measurement apparatus according to an embodiment of this application includes a carrier plate 2 and a line scan camera 3. The carrier plate 2 is configured to carry an electrode assembly 1. The line scan camera 3 is disposed opposite to the carrier plate 2 along a first direction X and configured to photograph the electrode assembly 1. The line scan camera 3 is configured to be movable relative to the carrier plate 2 along a second direction Y, and the first direction X is perpendicular to the second direction Y. The line scan camera 3 is configured to be movable.

A plurality of the line scan cameras 3 are disposed. The plurality of line scan cameras 3 include a first line scan camera 31 and a second line scan camera 32. The first line scan camera 31 and the second line scan camera 32 are arranged along a third direction Z, and the third direction Z intersects the second direction Y. The dimension measurement apparatus further includes a shelf 4. The carrier plate 2 and the line scan camera 3 are disposed on the shelf 4. The dimension measurement apparatus further includes a backlight source 5 connected to the shelf 4. The carrier plate 2 includes a carrier surface 21 configured to carry an electrode assembly 1 and a back surface 22 opposite to the carrier surface 21. The backlight source 5 is located on a side of back surface 22, the side facing away from the carrier surface 21.

Although this application has been described with reference to exemplary embodiments, various improvements may be made to the embodiments without departing from the scope of this application, and the components of this application may be replaced with equivalents. Particularly, to the extent that no structural conflict exists, various technical features mentioned in various embodiments may be combined in any manner. This application is not limited to the specific embodiments disclosed herein, but includes all technical solutions falling within the scope of the claims.

What is claimed is:

1. A dimension measurement apparatus, comprising:

a carrier plate, configured to carry a to-be-measured item, the to-be-measured item is an electrode assembly comprising an electrode body and two tabs, the electrode body comprising a top region and a bottom region disposed opposite to each other, the two tabs extending out from the top region; and a line scan camera, disposed opposite to the carrier plate along a first direction and configured to photograph the to-be-measured item, wherein the line scan camera is configured to be movable relative to the carrier plate along a second direction, and the first direction is perpendicular to the second direction, wherein a plurality of the line scan cameras are disposed, and the plurality of line scan cameras comprise a first line scan camera and a second line scan camera, wherein the first line scan camera and the second line scan camera are arranged along a third direction, and the third direction intersects the second direction and is parallel to an arrangement direction of the top region and the bottom region.

2. The dimension measurement apparatus according to claim 1, wherein the line scan camera is configured to be movable.

3. The dimension measurement apparatus according to claim 1, further comprising a shelf, wherein the carrier plate and the line scan camera are disposed on the shelf.

4. The dimension measurement apparatus according to claim 3, further comprising a backlight source connected to the shelf, wherein the carrier plate comprises a carrier surface configured to carry an electrode assembly and a back surface opposite to the carrier surface, and the backlight source is located on a side of back surface, the side facing away from the carrier surface.

5. The dimension measurement apparatus according to claim 4, further comprising a connecting piece, wherein the connecting piece is configured to connect the carrier plate and the shelf, a number of the backlight sources is two, and an accommodation space is provided between the two backlight sources, and the connecting piece passes through the accommodation space.

6. The dimension measurement apparatus according to claim 3, further comprising a flattening mechanism, wherein the flattening mechanism comprises a first driving piece and a pressing plate, the to-be-measured item is an electrode assembly, and the first driving piece is connected to the shelf and configured to drive the pressing plate to press a tab of the electrode assembly.

7. The dimension measurement apparatus according to claim 6, wherein the flattening mechanism further comprises a supporting piece, the supporting piece is connected to the shelf and comprises a contacting plane, and the contacting plane is configured to prop and contact a surface of the tab of the electrode assembly, the surface facing away from the pressing plate.

8. The dimension measurement apparatus according to claim 3, further comprising a positioning mechanism, wherein the positioning mechanism comprises a second driving piece and a positioning piece, and the second driving piece is connected to the shelf and configured to drive the positioning piece to push the to-be-measured item to a preset position.

9. The dimension measurement apparatus according to claim 1, wherein a shooting range of the first line scan camera covers at least the two tabs of the electrode assembly, and a shooting range of the second line scan camera covers at least a bottom region of the electrode assembly.

10. The dimension measurement apparatus according to claim 9, wherein the first line scan camera is further configured to photograph a top region of the electrode assembly, and a shooting range, covering the top region and extending along the third direction, of the first line scan camera is D1, satisfying: $D1>30$ mm.

11. The dimension measurement apparatus according to claim 10, wherein a shooting range of the first line scan camera along the third direction is D2, and a standard dimension of the tab along the third direction is D3, satisfying: $D2>D1+D3+K1$, and $5\ mm \leq K1 \leq 40$ mm.

12. The dimension measurement apparatus according to claim 11, wherein the shooting range of the first line scan camera along the third direction further comprises a first blank region, and the first blank region is located on a side of the tab, the side facing away from the top region.

13. The dimension measurement apparatus according to claim 11, wherein a resolution of the first line scan camera is Σ1, satisfying: $\Sigma1>40\times D2/L$, L being a tolerance zone width of a dimension of the electrode assembly along the third direction.

14. The dimension measurement apparatus according to claim 9, wherein a shooting range, covering the bottom region and extending along the third direction, of the second line scan camera is D4, satisfying: $D4>30$ mm.

15. The dimension measurement apparatus according to claim 14, wherein a shooting range of the second line scan camera along the third direction is D5, satisfying: $D5>D4+K2$, and $5\ mm \leq K2 \leq 40$ mm.

16. The dimension measurement apparatus according to claim 15, wherein the shooting range of the second line scan camera along the third direction further comprises a second blank region, and the second blank region is located on a side of the bottom region, the side facing away from the top region.

17. The dimension measurement apparatus according to claim 15, wherein a resolution of the second line scan camera is Σ2, satisfying: $\Sigma2\geq40\times D4/L$, L being a tolerance zone width of a dimension of the electrode assembly along the third direction.

18. A dimension measurement apparatus comprising:

a carrier plate, configured to carry a to-be-measured item; and a line scan camera, disposed opposite to the carrier plate along a first direction and configured to photograph the to-be-measured item, wherein the line scan camera is configured to be movable relative to the carrier plate along a second direction, and the first direction is perpendicular to the second direction, wherein a movement speed of the line scan camera along the second direction is v, satisfying: $450\ \text{mm/s} < v < 600\ \text{mm/s}$.

19. A dimension measurement apparatus comprising:

a carrier plate, configured to carry a to-be-measured item;

a line scan camera, disposed opposite to the carrier plate along a first direction and configured to photograph the to-be-measured item, wherein the line scan camera is configured to be movable relative to the carrier plate along a second direction, and the first direction is perpendicular to the second direction;

a shelf, wherein the carrier plate and the line scan camera are disposed on the shelf; and a backlight source connected to the shelf, wherein the carrier plate comprises a carrier surface configured to carry an electrode assembly and a back surface opposite to the carrier surface, and the backlight source is located on a side of back surface, the side facing away from the carrier surface.

20. The dimension measurement apparatus according to claim 19, further comprising a flattening mechanism, wherein the flattening mechanism comprises a first driving piece and a pressing plate, the to-be-measured item is an electrode assembly, and the first driving piece is connected to the shelf and configured to drive the pressing plate to press a tab of the electrode assembly.

21. The dimension measurement apparatus according to claim 19, further comprising a positioning mechanism, wherein the positioning mechanism comprises a second driving piece and a positioning piece, and the second driving piece is connected to the shelf and configured to drive the positioning piece to push the to-be-measured item to a preset position.

* * * * *